(12) United States Patent
Misawa

(10) Patent No.: US 11,494,813 B2
(45) Date of Patent: Nov. 8, 2022

(54) INFORMATION PROCESSING DEVICE AND METHOD FOR SHOPPING CART RETURN NOTIFICATION

(71) Applicant: TOSHIBA TEC KABUSHIKI KAISHA, Tokyo (JP)

(72) Inventor: Naoya Misawa, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 16/911,110

(22) Filed: Jun. 24, 2020

(65) Prior Publication Data
US 2021/0174405 A1 Jun. 10, 2021

(30) Foreign Application Priority Data

Dec. 6, 2019 (JP) .............................. JP2019-221613

(51) Int. Cl.
| | | |
|---|---|---|
| G06Q 30/02 | (2012.01) | |
| H04W 4/80 | (2018.01) | |
| G08B 21/24 | (2006.01) | |
| G08B 7/06 | (2006.01) | |
| G08B 21/18 | (2006.01) | |
| G06V 20/10 | (2022.01) | |

(52) U.S. Cl.
CPC ......... *G06Q 30/0281* (2013.01); *G06V 20/10* (2022.01); *G08B 7/06* (2013.01); *G08B 21/182* (2013.01); *G08B 21/24* (2013.01); *H04W 4/80* (2018.02)

(58) Field of Classification Search
CPC .... G06Q 30/0281; G08B 7/06; G08B 21/182; G08B 21/24; H04W 4/80; B62B 5/0096; G07F 7/0636
See application file for complete search history.

(56) References Cited

U.S. PATENT DOCUMENTS

| | | | | |
|---|---|---|---|---|
| 4,470,495 A | * | 9/1984 | Unger | .................. G07F 7/0627 |
| | | | | 194/205 |
| 5,283,550 A | * | 2/1994 | MacIntyre | ............ B62B 5/0423 |
| | | | | 340/568.5 |
| 8,325,982 B1 | | 12/2012 | Moon et al. | |

(Continued)

FOREIGN PATENT DOCUMENTS

| | | |
|---|---|---|
| CN | 108985884 A | 12/2018 |
| JP | 2007-054358 A | 3/2007 |
| JP | 6467602 B1 | 2/2019 |

OTHER PUBLICATIONS

Extended European Search Report dated Nov. 12, 2020 issued in corresponding European Patent Application No. 20192057.6, 19 pages.

*Primary Examiner* — John A Tweel, Jr.
(74) *Attorney, Agent, or Firm* — Foley & Lardner LLP

(57) ABSTRACT

According to one embodiment, an information processing device includes a processing circuit having programmed instructions to: determine a cart location of a shopping cart that is moved by a customer and used for transportation of a merchandise purchased by the customer; and provide a notification for promoting a return of the shopping cart to a return area for returning the shopping cart in response to a determination that (i) the shopping cart is located in a place outside of the return area and (ii) a stay time of the shopping cart at the place outside the return area exceeds a threshold length of time.

18 Claims, 10 Drawing Sheets

(56) References Cited

U.S. PATENT DOCUMENTS

| | | | |
|---|---|---|---|
| 10,315,679 B1 | 6/2019 | Robell | |
| 10,592,944 B2* | 3/2020 | Kundu | G07G 1/0036 |
| 2004/0111320 A1 | 6/2004 | Schlieffers et al. | |
| 2009/0153322 A1 | 6/2009 | Gough | |
| 2015/0025990 A1 | 1/2015 | Suzuki | |
| 2016/0260161 A1* | 9/2016 | Atchley | H04B 10/116 |
| 2018/0162432 A1* | 6/2018 | Jones | B62B 5/0053 |
| 2019/0073656 A1 | 3/2019 | Joseph et al. | |
| 2020/0079412 A1* | 3/2020 | Ramanathan | G06V 20/64 |
| 2022/0031093 A1* | 2/2022 | Nodera | G06Q 30/0635 |

\* cited by examiner

INFORMATION PROCESSING DEVICE AND METHOD FOR SHOPPING CART RETURN NOTIFICATION

CROSS-REFERENCE TO RELATED APPLICATION

This application is based upon and claims the benefit of priority from Japanese Patent Application No. 2019-221613, filed on Dec. 6, 2019, the entire contents of which are incorporated herein by reference.

FIELD

Exemplary embodiments described herein relate to an information processing device and a method.

BACKGROUND

In the related art, in a retail store such as a supermarket, a customer uses a shopping cart to move a merchandise as a purchase target. Recently, a device such as a display device or a merchandise registration device is mounted on a shopping cart, so that the customer can register a merchandise when the merchandise is placed into the shopping cart.

When the device is mounted on the shopping cart, an electric power source used by the device is required to be charged. Therefore, considered is a form of providing a charging device in which the device can be charged in a non-contact power supply scheme or the like at a predetermined location (hereinafter, referred to as a return place) inside the store, to charge the electric power when the shopping cart is returned to a return place.

Meanwhile, in the retail store, there is a problem in that a shopping cart is left behind inside the store or in a parking lot or the like provided outside the store. In the form described above, when the shopping cart is left behind in a place apart from the return place, it is likely that the device mounted on the shopping cart is not charged, and the electric power to be used by the device is not supplied. Therefore, a technique for promoting a return of a shopping cart to a return place is required.

DETAILED DESCRIPTION

In general, according to one embodiment, there is provided an information processing device and a method capable of promoting a return of a shopping cart to a return place.

An information processing device of the embodiment includes detection means and notification means. The detection means detects a presence location (e.g., a present location) of a shopping cart that is moved by a customer and used for transportation of a merchandise purchased by the customer. The notification means makes a notification for promoting a return to a return place, when the presence location of the shopping cart detected by the detection means is present at another place apart from the return place for returning the shopping cart and stay time at the other place exceeds a threshold.

Hereinafter, with reference to the accompanying drawings, embodiments of the information processing device and the shopping cart are described. The embodiments described below are exemplary embodiments of the information processing device and the shopping cart, and are not intended to limit configurations and specifications thereof.

First Embodiment

Figure 1:
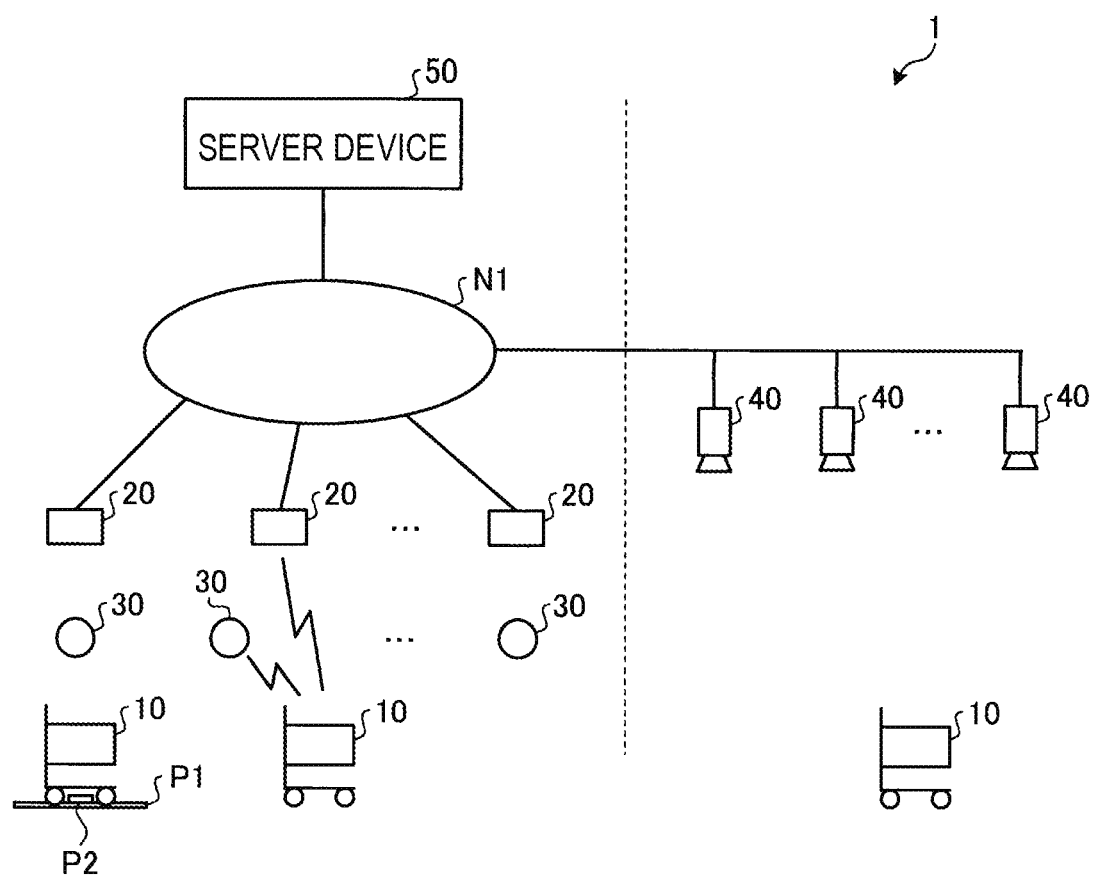
FIG. 1 is a diagram illustrating an example of a configuration of a shopping cart system according to a first embodiment.

FIG. 1 is a diagram illustrating an example of a configuration of a shopping cart system 1 according to the present embodiment. The shopping cart system 1 is a system provided, for example, in a retail store such as a supermarket.

As illustrated in FIG. 1, the shopping cart system 1 includes a cart 10, an access point 20, a short-range communication device 30, an imaging device 40, and a server device 50. In FIG. 1, the area on the left side of the broken line represents an inside of the store, and the area on the right side of the broken line represents an outside of the store.

The cart 10 is an example of the shopping cart used in a retail store such as a shopping center. In the present embodiment, the cart 10 is moved by a customer and used for transportation of a merchandise inside the store and outside the store.

Figure 2:
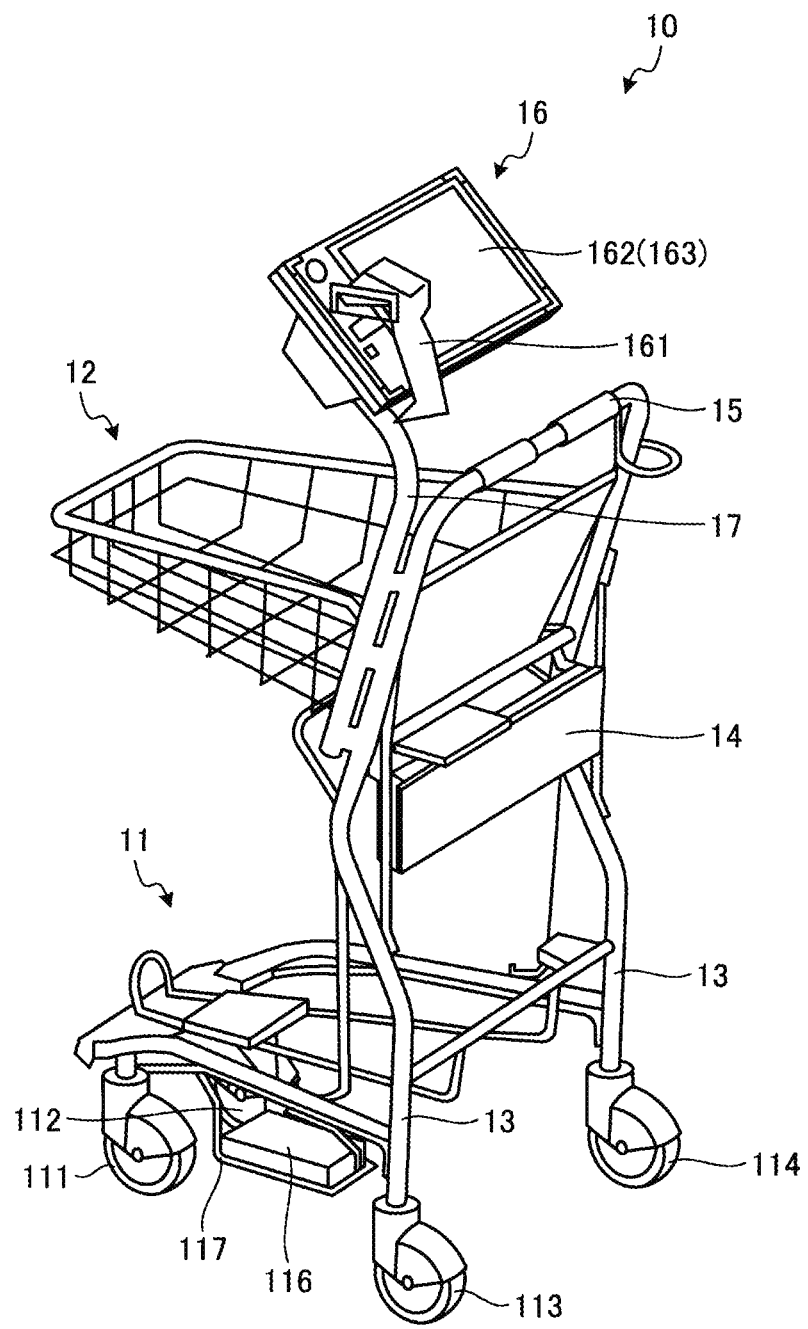
FIG. 2 is a perspective view illustrating an example of the cart according to the first embodiment.

FIG. 2 is a perspective view illustrating an example of the cart 10. As illustrated in FIG. 2, the cart 10 includes a base portion 11. The base portion 11 includes a pair of front wheels 111 and 112 and a pair of rear wheels 113 and 114 as wheels of the cart 10. An attachment portion 117 on which a power receiving portion 116 that receives power from a non-contact power supply is mounted is disposed on the lower side of the base portion 11. The power receiving portion 116 is substantially horizontally disposed.

A bag-like storage portion 12 (e.g., a basket) of which the upper surface is open is disposed on the upper side of the base portion 11. The storage portion 12 is supported by columns 13 extending from the base portion 11. The cart 10 may not have a form of including the storage portion 12 in the cart. The cart 10, for example, may have a form of including a bag receiving portion that receives a merchandise bag that holds a merchandise, and using the merchandise bag received by the bag receiving portion as the storage portion 12.

A holder 14 that holds a secondary battery (not illustrated) is disposed on the lower side of the storage portion 12. The secondary battery is a battery that is charged using power received by the power receiving portion 116.

The columns 13 include a handle portion 15 that is held by a customer who moves the cart 10. A support portion 17 that supports a cart terminal 16 is mounted on the columns 13.

The cart terminal 16 includes a scanner 161, a display unit 162 (e.g., a display), and an operation unit 163 (e.g., a user interface). The scanner 161 reads the merchandise information of the merchandise as a sales target. For example, the scanner 161 reads a merchandise code that can identify a merchandise indicated by a barcode or the like. The display unit 162 is a display device such as a crystal display. The display unit 162 displays, for example, a merchandise identified by the reading of the scanner 161. The operation unit 163 is, for example, a touch panel provided on a display surface of the display unit 162.

As described later, the cart terminal 16 includes a communication unit 166 and a short-range communication unit 167 (see FIG. 3) that can communicate with the access point 20 or the short-range communication device 30. The cart terminal 16 is driven by using electric power of the secondary battery held by the holder 14.

A return place P1 (see FIG. 1) (e.g., a return area) for returning the cart 10 described above is provided at a predetermined location inside the store. For example, a non-contact power supply device P2 that can transmit electric power (e.g., electrical energy) in a non-contact power supply scheme, for example, to the power receiving portion 116 of the cart 10, is installed at the return place P1. That is, the shopping cart system 1 of the present embodiment is configured such that electric power used by the cart terminal 16 and the like provided in the cart 10 is charged by returning the cart 10 to the return place P1. Locations for providing the return places P1 and the number thereof are not particularly limited.

The access point 20 is a communication device in conformity with the wireless communication standard such as wireless LAN. The access point 20 is connected to a network N1 provided inside the store, and a plurality thereof are provided inside the store to cover the entire area inside the store. The access point 20 relays the communication between the cart 10 and the server device 50 via the network N1 or relays the communication between the short-range communication device 30 and the server device 50.

The short-range communication device 30 is a communication device that can perform the short-range wireless communication such as Near field communication (NFC) or Bluetooth Low Energy (BLE) (registered trademark). The short-range communication devices 30 are provided at various locations inside the store and transmit location information capable of specifying the location at which the device is installed. The data type of the location information is not particularly limited, and various types can be used.

For example, the short-range communication device 30 transmits the location information indicating location coordinates inside the store in which the device is installed. In this case, the location information transmitted from the short-range communication device 30 indicates the presence location of the cart 10 (e.g., the cart terminal 16) inside the store which receives the location information.

For example, the short-range communication device 30 may transmit an identifier for identifying the terminal thereof as the location information. In this case, map information obtained by associating the identifier of the short-range communication device 30 and the location on a map inside the store corresponding to an installation location of the short-range communication device 30 are separately referred to, so that the presence location inside the store can be specified from the identifier of the short-range communication device 30.

The cart 10 (e.g., the cart terminal 16) in a communicable distance with the short-range communication device 30 receives the location information transmitted from the short-range communication device 30. The cart terminal 16 transmits the cart identifier for identifying the received location information and the terminal to the server device 50. Accordingly, the server device 50 can specify the presence location of the cart terminal 16 inside the store based on the set of the cart identifier and the location information which is transmitted from the cart terminal 16.

The short-range communication device 30 is not limited to a configuration of transmitting the location information and may be configured to receive (e.g., obtain) the cart identifier from the cart terminal 16. In this case, when the short-range communication device 30 receives the cart identifier from the cart 10 (e.g., the cart terminal 16) that is in the communicable distance, the short-range communication device 30 transmits the cart identifier to the server device 50 together with the location information of the device. Accordingly, the server device 50 can specify the presence location of the cart terminal 16 inside the store based on the set of the cart identifier and the location information transmitted from the short-range communication device 30.

When the short-range communication device 30 obtains the cart identifier from the cart terminal 16, the cart 10 may be configured to store the cart identifier in a passive tag such as a Radio Frequency IDentifier (RFID) tag (IC tag or RF tag). Accordingly, since the cart terminal 16 can transmit a cart identifier by an electromagnetic wave from the short-range communication device 30 (RFID reader), even when the electric power of the cart terminal 16 is lost, the server device 50 can be notified of the presence location of the cart 10.

A location for installing the short-range communication devices 30 and the number thereof are not particularly limited. However, the short-range communication devices 30 are installed at each return place P1 described above or near an entrance to an outdoor facility such as a parking lot provided outside the store.

The imaging device 40 is a digital camera or a video camera including an image sensor such as a charged coupled device (CCD) or a complementary metal oxide semiconductor (CMOS). One or the plurality of imaging devices 40 are provided outside the store so that a part or the entire area of an outdoor facility such as a parking lot provided outside the store can be imaged. The imaging device 40 is connected to the network N1, and transmits still image data and moving image data (hereinafter, collectively referred to as image data) obtained by imaging to the server device 50.

The server device 50 is an example of an information processing device. The server device 50 is installed, for example, in a back office of a store or the like. The server device 50 manages the cart location or the operation state of the cart 10 based on various kinds of information input via the network N1. Inside or the outside of the store, when the cart 10 is likely to be left behind at another place apart from the return place P1 or the cart 10 is left behind at another place apart from the return place P1, the server device 50 makes a notification for promoting a return to the return place P1.

Subsequently, the configuration examples of the cart 10 (e.g., the cart terminal 16) and the server device 50 are described.

Figure 3:
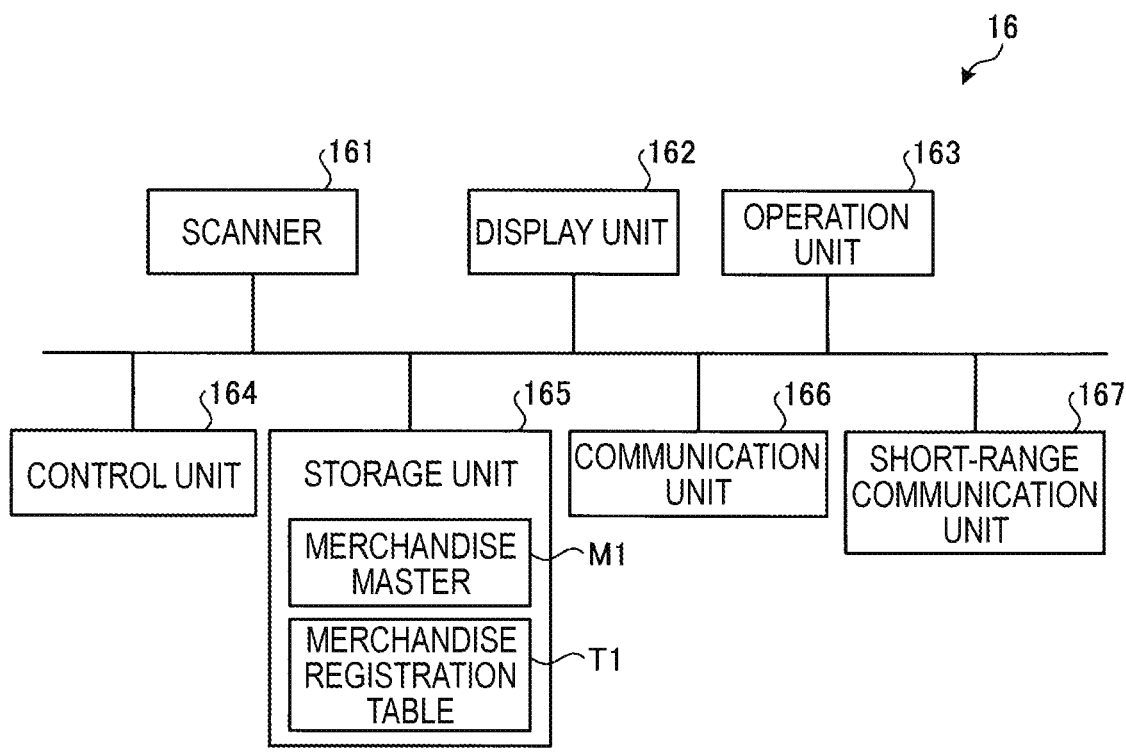
FIG. 3 is a diagram illustrating an example of a hardware configuration of a cart terminal according to the first embodiment.

First, the configuration of the cart terminal 16 is described. FIG. 3 is a diagram illustrating an example of a hardware configuration of the cart terminal 16. As illustrated in FIG. 3, the cart terminal 16 includes the scanner 161, the display unit 162, and the operation unit 163 described above. The cart terminal 16 includes a control unit 164 (e.g., a controller), a storage unit 165 (e.g., a memory), the communication unit 166 (e.g., a communication interface, a network interface, etc.), and the short-range communication unit 167 (e.g., a short-range communication interface).

The control unit 164 includes computer configurations such as a central processing unit (CPU), a read only memory (ROM), and a random access memory (RAM). The CPU is an example of the processor. The ROM is a storage medium for storing various programs and data. The RAM functions as a workspace of the CPU. The control unit 164 functions by causing the CPU to execute the program stored in the ROM or the storage unit 165, and integrally controls the operation of the cart terminal 16.

The storage unit 165 is a storage device such as a hard disk drive (HDD) or a solid state drive (SSD). The storage unit 165 stores various programs that can be executed by the control unit 164 (CPU), setting information, and the like.

The storage unit 165 stores a merchandise master M1 in which the merchandise information such as a merchandise name and a price is set in correlation with the merchandise code of each merchandise sold in the store. Here, the merchandise code is the identification information for identifying the classification of the merchandise. In the present embodiment, the cart terminal 16 has a form of locally maintaining the merchandise master M1, but the embodiment is not limited thereto. For example, the cart terminal 16 may be a form of referring to the merchandise master M1 maintained by the store server (not illustrated) connected to the network N1.

The storage unit 165 stores a merchandise registration table T1 for registering the merchandise code, the merchandise information, and the like of a merchandise purchased by a customer with one transaction. Specifically, the merchandise registration table T1 stores the merchandise information, the number of purchased items, and the like corresponding to the merchandise code, in correlation with the merchandise code read by the scanner 161 from the merchandise.

The communication unit 166 is a wireless communication interface that can be connected to the network N1 via the access point 20. The communication unit 166 can communicate with the server device 50 via the access point 20.

The short-range communication unit 167 is a communication interface for the short-range wireless communication that can communicate with the short-range communication device 30. For example, the short-range communication unit 167 communicates with the short-range communication device 30 in a communicable range and receives the location information transmitted from the short-range communication device 30.

Figure 4:
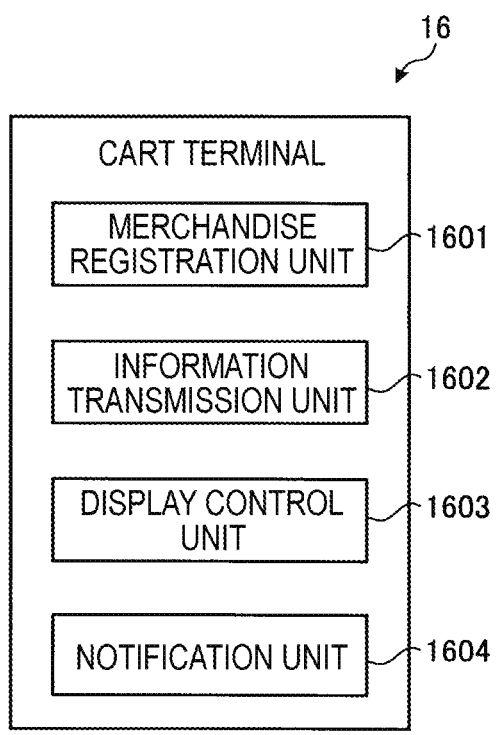
FIG. 4 is a diagram illustrating an example of a functional configuration of the cart terminal according to the first embodiment.

FIG. 4 is a diagram illustrating an example of a functional configuration of the cart terminal 16. As illustrated in FIG. 4, the cart terminal 16 includes a merchandise registration unit 1601, an information transmission unit 1602, a display control unit 1603, and a notification unit 1604 as functional units or modules. A portion or all of the functional units may have a software configuration realized in cooperation with the processor (e.g., the CPU) and various programs stored in the memory (e.g., the ROM or the storage unit 165) or may have a hardware configuration realized by a dedicated circuit or the like.

The merchandise registration unit 1601 is an example of the merchandise registration device. The merchandise registration unit 1601 stores (e.g., registers) the merchandise information of the merchandise corresponding to the merchandise code read by the scanner 161 in the merchandise registration table T1 as the merchandise which is the sales target (e.g., purchase target).

Specifically, when an input of instructing a registration start is received via the operation unit 163, the merchandise registration unit 1601 operates the scanner 161 to move the operation state of the cart 10 (e.g., the cart terminal 16) to an "occupied" state in which a merchandise can be registered. In the occupied operation state, when the merchandise registration unit 1601 receives the merchandise code read from the scanner 161, the merchandise registration unit 1601 extracts the merchandise information correlating with a merchandise code the same as the merchandise code from the merchandise master M1. The merchandise registration unit 1601 registers the merchandise code read by the scanner 161 and the extracted merchandise information in the merchandise registration table T1 in a correlating manner.

When the merchandise registration unit 1601 receives an input for instructing a settlement start via the operation unit 163, an operation of the scanner 161 is stopped. Subsequently, when each set of the merchandise code and the merchandise information registered in the merchandise registration table T1 is read, the merchandise registration unit 1601 transmits the set to the settlement device (not illustrated) together with the cart identifier of the cart 10 (e.g., the cart terminal 16). When the settlement device notifies the merchandise registration unit 1601 of the settlement completion, the merchandise registration unit 1601 clears the merchandise registration table T1 and moves the operation state of the cart 10 to a "standby" state.

A transmission method to the settlement device is not particularly limited, and the transmission can be performed, for example, by using a communication device such as the communication unit 166 or the short-range communication unit 167.

The information transmission unit 1602 transmits various kinds of information about the cart 10 via the communication unit 166 to the server device 50. For example, when the location information transmitted from the short-range communication device 30 is received by the short-range communication unit 167, the information transmission unit 1602 transmits the location information to the server device 50 together with the cart identifier of the cart 10. The information transmission unit 1602 may transmit the location information to the server device 50 whenever the short-range communication unit 167 receives the location information, or may transmit the location information to the server device 50 whenever the received location information changes, that is, whenever the presence location of the cart 10 changes.

For example, when the operation state of the cart 10 (e.g., the cart terminal 16) changes by the process of the merchandise registration unit 1601, the information transmission unit 1602 transmits the operation state after the change to the server device 50 together with the cart identifier of the cart 10.

The display control unit 1603 controls the display unit 162 to cause the display unit 162 to display various screens. Specifically, the display control unit 1603 causes the display unit 162 to display various operators relating to the operation of the cart terminal 16. For example, the display control unit 1603 causes the display unit 162 to display an operator for instructing of the registration start or the payment start of the merchandise. The display control unit 1603 causes the display unit 162 to display the merchandise information of the merchandise registered by the merchandise registration unit 1601 or the like.

The display control unit 1603 causes the display unit 162 to display various notification screens in cooperation with the notification unit 1604. Specifically, the display control unit 1603 causes the display unit 162 to display a message or an image for promoting a return of the cart 10 to the return place P1 as the notification screen.

The notification unit 1604 is an example of a notification unit. The notification unit 1604 makes a notification in response to the notification instruction from the server device 50. Specifically, when a notification instruction is received from the server device 50 via the communication unit 166, the notification unit 1604 causes the display unit 162 to display the notification screen according to the instruction content in cooperation with the display control unit 1603.

In the present embodiment, the notification unit 1604 has a form of making a notification by displaying the notification screen on the display unit 162, but the notification method is not limited thereto. For example, when the cart terminal 16 includes a voice output device that can output an artificial voice, the notification unit 1604 may have a form of outputting a voice according to the instruction content from the voice output device.

Figure 5:
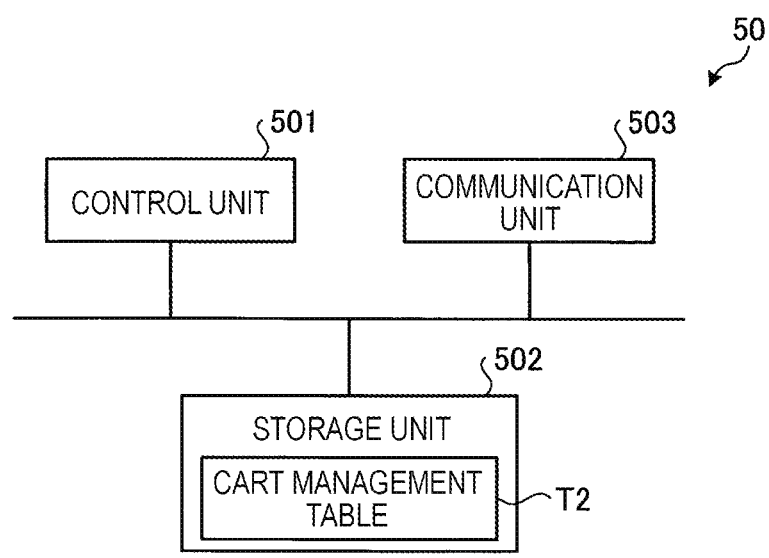
FIG. 5 is a diagram for illustrating an example of a hardware configuration of a server device according to the first embodiment.

Subsequently, a configuration of the server device 50 is described. FIG. 5 is a diagram for illustrating an example of a hardware configuration of the server device 50. As illustrated in FIG. 5, the server device 50 includes a control unit 501 (e.g., a controller), a storage unit 502 (e.g., a memory), and a communication unit 503 (e.g., a communication interface, a network interface, etc.).

The control unit 501 includes a computer configuration such as a CPU, a ROM, and a RAM. The CPU is an example of the processor. The ROM is a storage medium that stores various programs and data. The RAM functions as a workspace of the CPU. The control unit 501 functions by causing the CPU to execute the program stored in the ROM or the storage unit 502 and integrally controls the operation of the server device 50.

The storage unit 502 is a storage device such as an HDD or an SSD. The storage unit 502 stores various programs that can be executed by the control unit 501 (CPU), setting information, and the like.

The storage unit 502 stores a cart management table T2 for managing a presence location (hereinafter, also referred to as a cart location) or an operation state of the cart 10 or the like, in correlation with the cart identifier of each cart 10.

Figure 6:
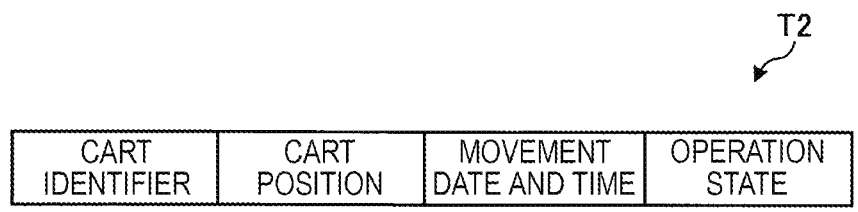
FIG. 6 is a diagram for illustrating an example of a data configuration of a cart management table according to the first embodiment.

FIG. 6 is a diagram for illustrating an example of a data configuration of the cart management table T2. As illustrated in FIG. 6, the cart management table T2 correlates with a cart identifier and stores a cart location, movement date and time, an operation state, and the like. Here, in the cart location, the location information of the short-range communication device 30 that lastly communicates with the cart 10 (e.g., the cart terminal 16), that is, the location information indicating the latest cart location is stored. In the movement date and time, the date and time information indicating the date and time at which the latest cart location (location information) is obtained is stored. In the operation state, the operation state (such as occupied or standby) of the cart 10 (the cart terminal 16) is stored.

Referring back to FIG. 5, the communication unit 503 is a communication interface that can be connected to the network N1. The communication unit 503 communicates with the cart terminal 16 or the short-range communication device 30 via the access point 20 connected to the network N1. The communication unit 503 receives the image data transmitted from each of the imaging devices 40 connected to the network N1.

Figure 7:
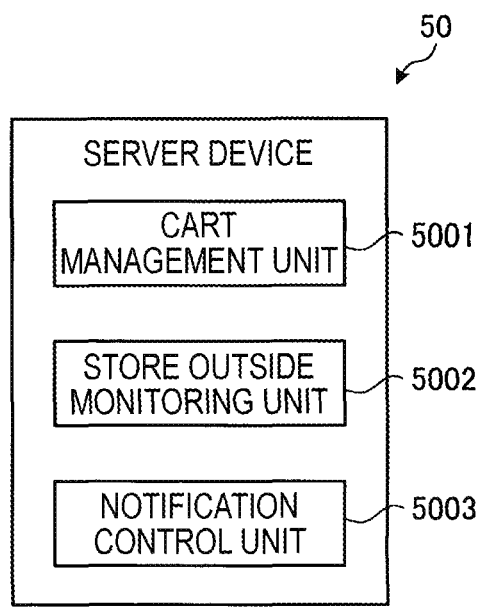
FIG. 7 is a diagram for illustrating an example of a functional configuration of the server device according to the first embodiment.

FIG. 7 is a diagram for illustrating an example of the functional configuration of the server device 50. As illustrated in FIG. 7, the server device 50 includes a cart management unit 5001, a store outside monitoring unit 5002, and a notification control unit 5003. One or all of these functional units may have software configurations realized in cooperation with the processor (CPU) and various programs stored in the memory (ROM or the storage unit 502) or may have a hardware configuration realized by a dedicated circuit or the like.

The cart management unit 5001 performs a process for managing the cart location or the operation state of each of the carts 10 based on the information transmitted from the cart 10 or the short-range communication device 30.

For example, when the set of the cart identifier and the location information is received via the communication unit 503, the cart management unit 5001 registers (e.g., overwrites) the received location information in the "cart location" correlating with the corresponding cart identifier of the cart management table T2 and registers the date and time at which the registration thereof is performed in the "date and time information". For example, when the set of the cart identifier and the operation state is received via the communication unit 503, the cart management unit 5001 registers (e.g., overwrites) the received operation state in the "operation state" correlating to the corresponding cart identifier of the cart management table T2.

The cart management unit 5001 may have a configuration of comparing the cart location (e.g., location information) registered in the cart management table T2 with the received location information on a per cart identifier basis and updating the cart location when the location information changes.

The store outside monitoring unit 5002 is an example of the recognition unit. The store outside monitoring unit 5002 detects the cart 10 present outside the store or the operation state of the cart 10 based on the image data obtained by imaging each of the imaging devices 40. Specifically, the store outside monitoring unit 5002 analyzes the image data input via the network N1 and recognizes the cart 10 present outside the store from the image data.

The store outside monitoring unit 5002 analyzes the image data to recognize the operation state of the cart 10. For example, the store outside monitoring unit 5002 derives the moving direction, the path, the speed, and the like of the cart 10 from image data that is continuous in time series. From these derivation results, the store outside monitoring unit 5002 determines the operation state, such as whether the cart 10 is in a state of being moved to a vehicle or the like placed in the parking lot, in a state of being moved from the parking lot to the store, in a state of being left behind, or the like.

The store outside monitoring unit 5002 may analyze the movement of the customer using the cart 10 to determine the operation state of the cart 10. For example, the store outside monitoring unit 5002 may recognize the operation of unloading a merchandise from the cart 10 to determine a state where the cart 10 is unloaded.

When the cart identifier of the cart 10 is visually displayed on the surface of the cart 10, the store outside monitoring unit 5002 may recognize the cart identifier of the cart 10 from the image data. In this case, the cart management unit 5001 may cooperate with the store outside monitoring unit 5002 to register the location information indicating that the cart is outside the store or the operation state in the cart management table T2, in correlation with the cart identifier recognized by the store outside monitoring unit 5002.

The store outside monitoring unit 5002 may estimate the cart identifier of the cart 10 moved outside the store based on the cart location or the movement date and time registered in the cart management table T2 or the like. For example, when the cart 10 extracted from the inside of the store to the outside is detected from the image data, the store outside monitoring unit 5002 searches a cart identifier of which the presence is confirmed at the entrance of the store within a predetermined period of time from the detection timing, from the cart management table T2. The store outside monitoring unit 5002 may have a form of monitoring the operation state in correlation with the cart identifier and the cart 10 in the image data when the corresponding cart identifier is present.

The notification control unit 5003 cooperates with the cart management unit 5001 and the store outside monitoring unit 5002 described above to function as an example of the detection unit and the determination unit. The notification control unit 5003 functions as an example of the notification unit.

The notification control unit 5003 detects the cart 10 that is likely to be left behind at another place apart from the return place P1 or the cart 10 that is left behind at another place apart from the return place P1 as the notification target, based on the process results of the cart management unit 5001 and the store outside monitoring unit 5002. The notification control unit 5003 makes a notification for promoting a return of the cart 10 as the notification target to the return place P1 to the customer or the clerk.

Specifically, the notification control unit 5003 detects the cart location registered in the cart management table T2 or the cart location (e.g., presence location) of each of the carts 10 inside and outside the store, based on the recognition results of the store outside monitoring unit 5002. The notification control unit 5003 determines the operation state of each of the carts 10 based on the operation state registered in the cart management table T2 and the recognition result of the store outside monitoring unit 5002. When the operation state or the cart location of the cart 10 satisfies a predetermined condition, the notification control unit 5003 determines whether the cart 10 is likely to be left behind at another place apart from the return place P1 or is left behind at another place apart from the return place P1.

For example, when the cart 10 (e.g., the cart identifier) of which the cart location is a place apart from the return place P1 and the operation state is switched from "occupied" to "standby", that is, the cart 10 of which the settlement has been completed is detected, the notification control unit 5003 determines that it is likely that the cart 10 is likely to be left behind at another place apart from the return place P1. For example, even if the operation state is "occupied", when the cart 10 (e.g., cart identifier) of which the cart location is a place apart from the return place P1 and the elapsed time (hereinafter, referred to as stay time) from the date and time that is registered in the movement date and time exceeds a threshold (for example, 15 minutes) is detected, the notification control unit 5003 determines that the cart 10 is likely to be left behind at another place apart from the return place P1. When the cart 10 moves from the inside of the store to the outside of the store or the state of being moved in a direction of separating from the store is detected, the notification control unit 5003 determines that the cart 10 is likely to be left behind at another place apart from the return place P1.

When the cart 10 (e.g., cart identifier) of which the operation state is "standby", the cart location is a place apart from the return place P1, and the stay time from the date and time that is registered in the movement date and time exceeds the threshold (for example, 15 minutes) is detected, the notification control unit 5003 determines that the cart 10 is left behind another place apart from the return place P1. For example, when the cart 10 in a stationary state is continuously detected (e.g., recognized) for a predetermined period of time (for example, 15 minutes) outside the store, the notification control unit 5003 determines that the cart 10 is left behind at another place apart from the return place P1.

The notification control unit 5003 determines the notification method based on the determination result, and makes a notification by the determined notification method. Here, the notification method is not particularly limited, and various methods can be employed.

For example, the notification control unit 5003 transmits notification information including a message for promoting a return to the return place P1 to the cart terminal 16 corresponding to the cart identifier of the cart 10 set as the notification target via the network N1. The cart terminal 16 (e.g., the notification unit 1604) that receives the notification information notifies the customer using the cart 10 by causing the display unit 162 to display the notification screen according to the notification information.

For example, the notification control unit 5003 transmits the notification information including the cart identifier and the cart location of the cart 10 set as the notification target to a clerk terminal such as a POS terminal operated by the clerk, via the network N1. The clerk terminal that receives the notification information notifies a clerk by causing a display unit (not illustrated) to display the screen according to the notification information.

In the present embodiment, since access point 20 is not installed outside the store, the notification control unit 5003 cannot transmit the notification information to the cart 10 present outside the store. Therefore, by providing a voice output device such as a speaker outside the store, the notification control unit 5003 can notify the customer using the cart 10 by store outside broadcasting of output a voice (e.g., an auditory prompt) for promoting a return to the return place P1 via a voice output device.

The notification control unit 5003 may differentiate the contents of the notification information into the notification information to be transmitted to the customer and the notification information to be transmitted to the clerk. For example, the notification control unit 5003 may include map information indicating a moving route to the return place P1 closest to the cart location from the cart 10 set as the notification target in the notification information transmitted to the customer.

Figure 8:
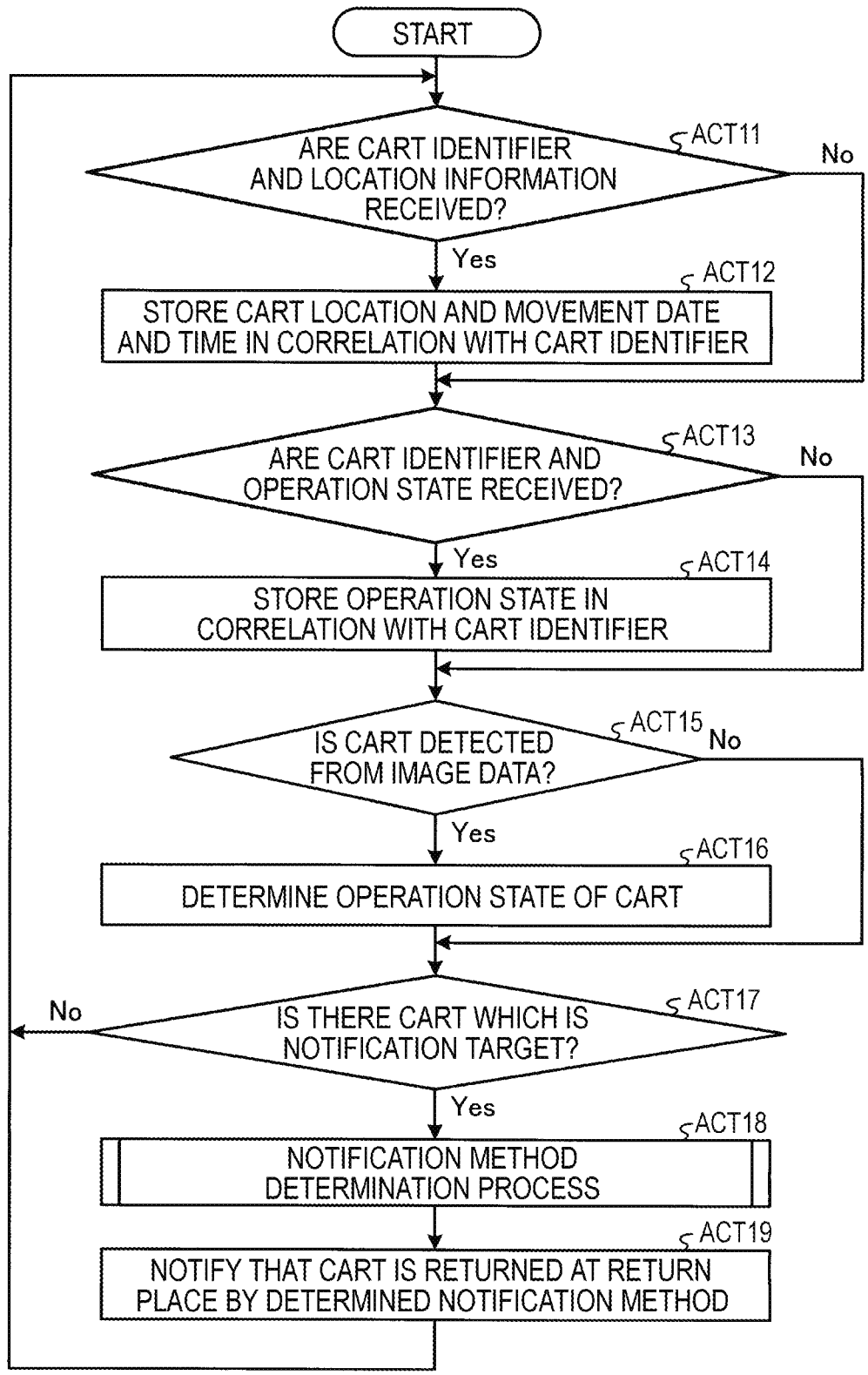
FIG. 8 is a flowchart for describing an example of a process performed by the server device according to the first embodiment.

Hereinafter, the operation example of the server device 50 is described. FIG. 8 is a flowchart for describing an example of a process performed by the server device 50.

First, the cart management unit 5001 determines whether a set of the cart identifier and the location information is received via the network N1 (ACT 11). When the cart management unit 5001 receives the set of the cart identifier and the location information (ACT 11; Yes), the received location information (e.g., cart location) and the received movement date and time are stored in the cart management table T2 in correlation with the corresponding cart identifier (ACT 12), and the process moves to ACT 13. In ACT 11, when the set of the cart identifier and the location information is not received (ACT 11; No), the process moves to ACT 13.

Subsequently, the cart management unit 5001 determines whether the set of the cart identifier and the operation state is received via the network N1 (ACT 13). When the cart management unit 5001 receives the set of the cart identifier and the operation state (ACT 13; Yes), the received operation state is stored in the cart management table T2 in correlation with the corresponding cart identifier (ACT 14), the process moves to ACT 15. In ACT 13, when the set of the cart identifier and the operation state is not received (ACT 13; No), the process moves to ACT 15.

Subsequently, the store outside monitoring unit 5002 analyzes the image data input via the network N1 and determines whether the cart 10 is detected from the image data (ACT 15). When the cart 10 is detected from the image data (ACT 15; Yes), the store outside monitoring unit 5002 determines the operation state of the cart 10 from the information according to the cart 10 in the image data (ACT 16), and the process moves to ACT 17. In ACT 15, when the cart 10 is not detected from the image data (ACT 15; No), the process moves to ACT 17.

As described above, the store outside monitoring unit 5002 can specify the cart identifier of the cart 10 moved outside the store from various information obtained by reading the cart identifier displayed in the cart 10 and/or registered in the cart management table T2. When the store outside monitoring unit 5002 specifies the cart identifier, the cart location, the movement date and time, and the operation state of the corresponding cart identifier stored in the cart management table T2 are updated at the timing of ACT 15 or 16.

Subsequently, the notification control unit 5003 determines whether the cart 10 as the notification target is present based on the process result of the information stored in the cart management table T2 or the process result of the store outside monitoring unit 5002 (ACT 17). Here, when it is determined that the cart 10 as the notification target is present (ACT 17; Yes), the notification control unit 5003 determines the notification method described later (ACT 18), and the process moves to ACT 19. In ACT 17, when the cart 10 as the notification target is not present (ACT 17; No), the process returns to ACT 11.

Subsequently, in ACT 19, the notification control unit 5003 makes a notification for promoting a return of the cart 10 to the return place P1 by using the notification method determined in ACT 18 (ACT 19), and the process returns to ACT 11.

Figure 9:
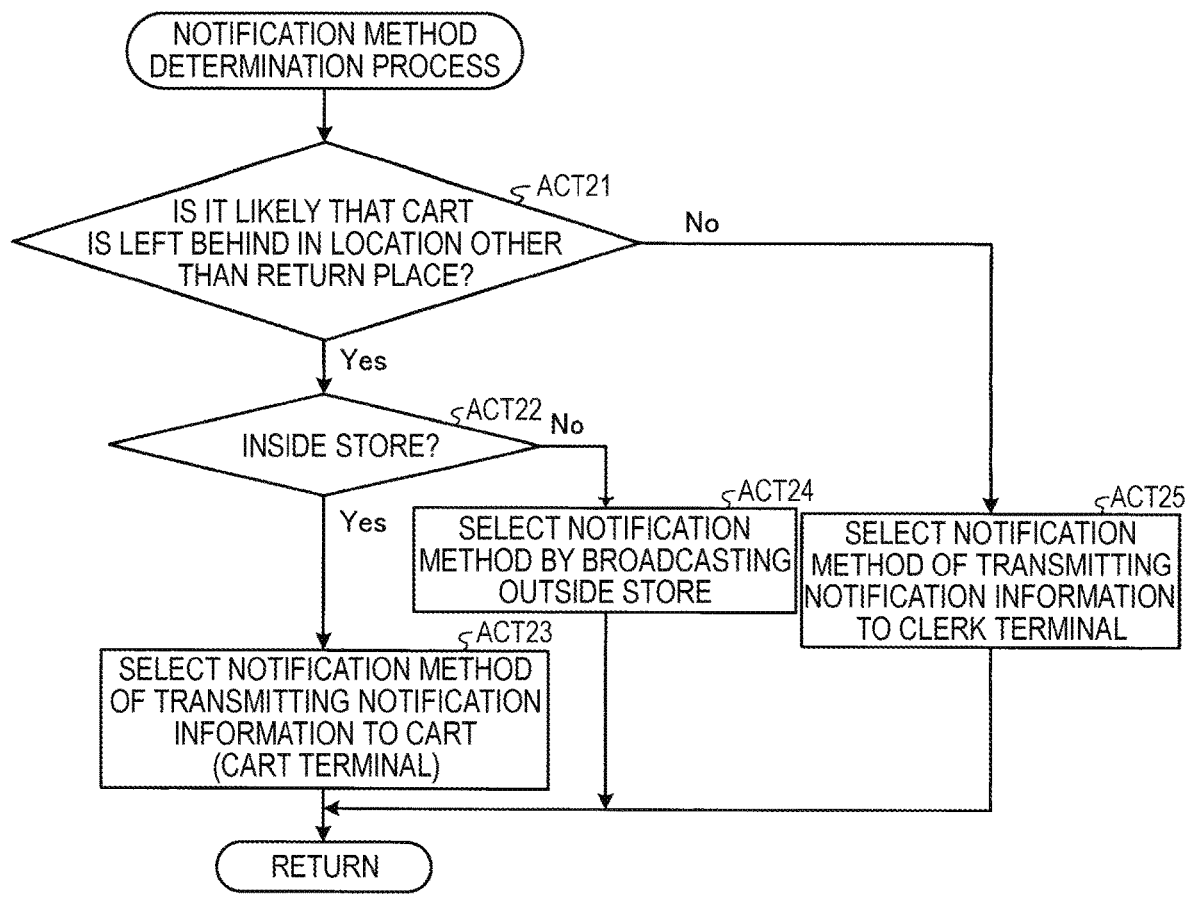
FIG. 9 is a flowchart for describing an example of a process of determining a notification method performed by the server device according to the first embodiment.

Subsequently, the process of determining the notification method is described. FIG. 9 is a flowchart for describing an example of the process of determining the notification method performed by the server device 50.

First, the notification control unit 5003 determines whether the cart 10 as the notification target is likely to be left behind at another place apart from the return place P1 based on the operation state or the date and time information registered in the cart management table T2 and the process result of the store outside monitoring unit 5002 (ACT 21). Here, when it is determined that the cart is likely to be left behind at another place apart from the return place P1, (ACT 21; Yes), the notification control unit 5003 moves to ACT 22.

In ACT 22, the notification control unit 5003 determines at which place of the inside of the store and the outside of the store, the cart 10 as the notification target is, based on the cart location registered in the cart management table T2 and the process result of the store outside monitoring unit 5002 (ACT 22).

When it is determined that the cart 10 as the notification target is inside the store (ACT 22; Yes), the notification control unit 5003 selects the notification method for transmitting the notification information to the cart terminal 16 corresponding to the cart identifier of the cart 10 as the notification target (ACT 23), and the process moves to ACT 19 of FIG. 8. According to the notification method, the customer using the cart 10 inside the store can be notified of a return of the cart 10 to the return place P1 by displaying the notification screen, and thus it is possible to promote the movement of the cart 10 to the return place P1.

When it is determined that the cart 10 as the notification target is outside the store (ACT 22; No), the notification control unit 5003 selects the voice output device provided outside the store by the notification method (ACT 24), and the process moves to ACT 19 of FIG. 8. By the notification method, the customer using the cart 10 outside the store can be notified of the return of the cart 10 to the return place P1 by the broadcasting outside the store, and thus it is possible to promote the movement of the cart 10 to the return place P1.

In ACT 21, when it is determined that the cart 10 as the notification target is left behind at another place apart from the return place P1 (ACT 21; No), the notification control unit 5003 moves to ACT 25.

In ACT 25, the notification control unit 5003 selects the notification method for transmitting the notification information to the clerk terminal used by the clerk (ACT 25), and the process moves to ACT 19 of FIG. 8. According to the notification method, the clerk can be notified that the cart 10 is left behind at another place apart from the return place P1, and thus the movement of the cart 10 to the return place P1 can be promoted.

As described above, the server device 50 detects the presence location of the cart 10 that is moved by the customer and used for the transportation of the merchandise purchased by the customer and makes a notification for promoting the return to the return place when the presence location of the cart 10 is present at another place apart from the return place P1 for returning the shopping cart and the stay time at the other place exceeds a threshold.

Accordingly, when the cart 10 is likely to be left behind at another place apart from the return place P1 or the cart 10 is left behind at another place apart from the return place P1, the server device 50 can notify the customer using the cart 10 or the clerk. Accordingly, the server device 50 can promote the return (e.g., movement) of the cart 10 to the return place. Accordingly, since the server device 50 can reduce the likelihood of situations in which the cart 10 cannot be charged, the operation rate of the cart 10 or the cart terminal 16 can be improved.

In the present embodiment, the operation state of the cart 10 is divided into two states of occupied and standby states in response to the process of the merchandise registration unit 1601, but the division of the operation state is not limited thereto. For example, whether the cart 10 is charged or not may be divided as the operation state based on the state of the power receiving portion 116. The movement speed of the cart 10 or a state such as moving or stationary may be divided as the operation state using a sensor device such as an acceleration sensor.

The notification control unit 5003 may determine whether the cart 10 is likely to be left behind at another place apart from the return place P1 or is left behind at another place based on the specifically divided operation state of the cart 10. For example, in addition to the above conditions, the notification control unit 5003 may have a form of adding whether the cart 10 is in a charging state and whether the cart 10 is stationary, in addition to the above condition.

In the present embodiment, the presence location of the cart 10 is specified by using the short-range communication device 30, but the embodiment is not limited to this form. For example, the cart 10 may use a known positioning technique such as a global positioning system (GPS) or Wi-Fi positioning to specify the presence location of the cart 10.

In the present embodiment, the presence of the cart 10 outside the store is detected by using the imaging device 40. However, the present embodiment is not limited thereto, and in the same manner as inside the store, the access point 20 or the short-range communication device 30 may have a form of being provided outside the store. In this case, the notification control unit 5003 may use the transmission of the notification information to the cart 10 as the notification method to the cart 10 present outside the store.

Second Embodiment

In the first embodiment described above, a form in which the cart terminal 16 makes a notification under the control of the server device 50 (e.g., the notification control unit 5003) has been described. In the present embodiment, for example, a form in which the cart terminal 16 alone can make a notification even in a circumstance where the cart terminal 16 cannot be connected to the network N1 outside the store or the like is described. The same components as those in the first embodiment are denoted by the same reference numerals, and description thereof will be omitted.

Figure 10:
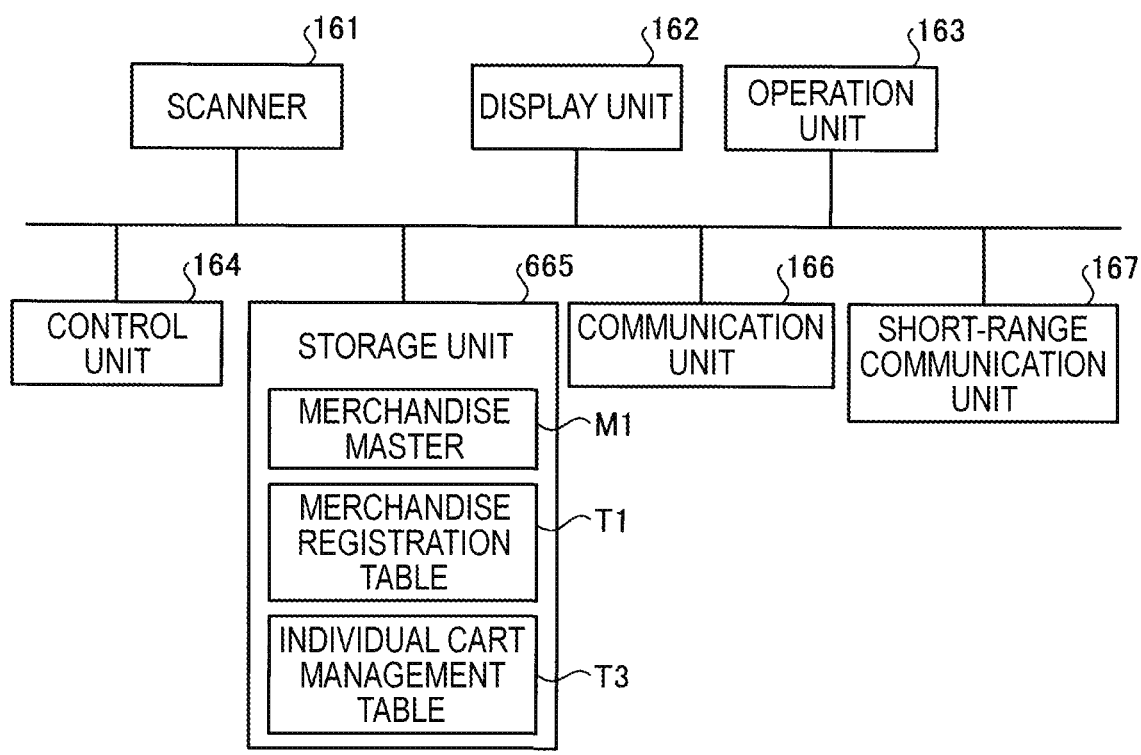
FIG. 10 is a diagram illustrating an example of a hardware configuration of a cart terminal according to a second embodiment.

FIG. 10 is a diagram illustrating an example of a hardware configuration of a cart terminal 66 according to the present embodiment. As illustrated in FIG. 10, the cart terminal 66 includes the scanner 161, the display unit 162, the operation unit 163, the control unit 164, a storage unit 665, the communication unit 166, and the short-range communication unit 167. The cart terminal 66 is an example of the information processing device according to the present embodiment.

Here, the storage unit 665 is a storage device corresponding to the storage unit 165 described in the first embodiment. In the same manner as the storage unit 165, the storage unit 665 stores various programs or setting information, the merchandise master M1, the merchandise registration table T1, and the like. The storage unit 665 stores the individual cart management table T3 for managing the cart location or the operation state of the cart 10.

Figure 11:
FIG. 11 is a diagram illustrating an example of a data configuration of an individual cart management table according to the second embodiment.

FIG. 11 is a diagram illustrating an example of a data configuration of the individual cart management table T3. As illustrated in FIG. 11, an individual cart management table T3 stores the cart location, the movement date and time, the operation state, and the like. Here, in the cart location, the location information of the short-range communication device 30 that lastly communicates with the cart 10 (e.g., the cart terminal 16), that is, the location information indicating the latest cart location is stored. In the movement date and time, the date and time information indicating the date and time at which the latest cart location (e.g., location information) is obtained is stored. In the operation state, the operation state (e.g., occupied or standby) in response to the process of the merchandise registration unit 1601 is stored.

Figure 12:
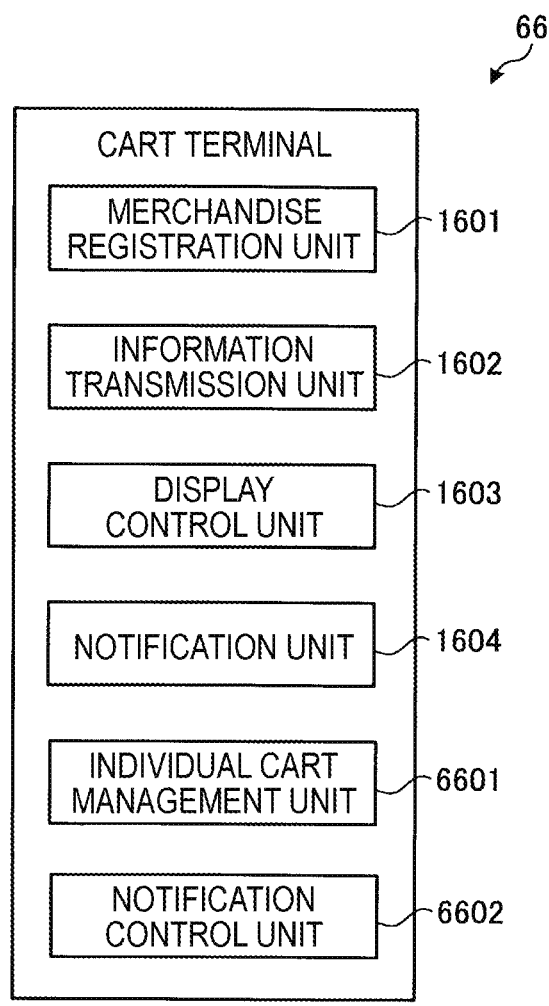
FIG. 12 is a diagram illustrating an example of a functional configuration of the cart terminal according to the second embodiment.

FIG. 12 is a diagram illustrating an example of a functional configuration of the cart terminal 66. As illustrated in FIG. 12, the cart terminal 66 includes the merchandise registration unit 1601, the display control unit 1603, the notification unit 1604, an individual cart management unit 6601, and the notification control unit 6602, as the functional units. One or all of the functional units may have software configurations realized in cooperation with the processor (CPU) and various programs stored in the memory (ROM or the storage unit 665) or may have a hardware configuration realized by a dedicated circuit or the like.

The individual cart management unit 6601 executes various processes for managing the cart position or the operation state of the cart 10.

For example, when the short-range communication unit 167 receives the location information transmitted from the short-range communication device 30, the individual cart management unit 6601 registers (e.g., overwrites) the location information thereof in the individual cart management table T3 as the cart location. The individual cart management unit 6601 registers the date and time at which the cart location is registered in the individual cart management table T3 as the movement date and time. The information transmission unit 1602 preferably updates the cart location whenever the received location information changes, that is, whenever the presence location of the cart 10 changes.

For example, when the operation state of the cart 10 (the cart terminal 16) changes by the process of the merchandise registration unit 1601, the individual cart management unit 6601 registers the operation state after the change in the individual cart management table T3.

A notification control unit 6602 cooperates with the individual cart management unit 6601 described above to function as an example of the detection unit and the determination unit. The notification control unit 5003 functions as an example of the notification unit.

The notification control unit 6602 determines whether the cart 10 is likely to be left behind at another place apart from the return place P1 or is left behind at another place apart from the return place P1 based on the process result of the individual cart management unit 6601. When the cart is likely to be left behind or is left behind, the notification control unit 6602 notifies the customer or the clerk of the promotion of the return to the return place P1.

Specifically, the notification control unit 6602 detects the cart location (e.g., presence location) of the cart 10 based on the cart location registered in the individual cart management table T3. The notification control unit 6602 determines the operation state of the cart 10 based on the operation state registered in the individual cart management table T3. When the cart location operation state satisfies a predetermined condition, the notification control unit 6602 determines that the cart 10 is likely to be left behind at another place apart from the return place P1 or is left behind at another place apart from the return place P1.

For example, when it is detected that the cart location is outside of the return place P1, and the operation state is switched from "occupied" to "standby", the notification control unit 6602 determines that the cart 10 is likely to be left behind at another place apart from the return place P1. For example, even if the operation state is "occupied", when it is detected that the cart location is a place apart from the return place P1 and the stay time from the date and time that is registered in the movement date and time exceeds the threshold (for example, 15 minutes), the notification control unit 6602 determines that the cart 10 is likely to be left behind at another place apart from the return place P1.

For example, when it is detected that the operation state is "standby", the cart location is a place apart from the return place P1, and the stay time from the date and time that is registered in the movement date and time exceeds the threshold (for example, 15 minutes), the notification control unit 6602 determines that the cart 10 is left behind at another place apart from the return place P1.

The notification control unit 6602 determines the notification method based on the determination result and makes a notification by the determined notification method. Here, the notification method is not particularly limited, and various method can be employed.

For example, the notification control unit 6602 controls the notification unit 1604 and selects the notification method for displaying the notification screen on the display unit 162, to notify the customer using the cart 10. The notification control unit 6602 may make a notification by transmitting the notification information including the cart identifier or the location information of the cart 10 to the clerk terminal.

The notification control unit 6602 may perform the processes described above independently from the server device 50 or may perform the processes when communication with the server device 50 is interrupted. Accordingly, in the cart terminal 66, even if the cart 10 is moved outside the store where the network N1 is not installed, a notification can be made by using the display unit 162. Therefore, comparing with the notification method using broadcasting, it is possible to promote the return to the return place P1 directly to the customer using the cart 10.

Figure 13:
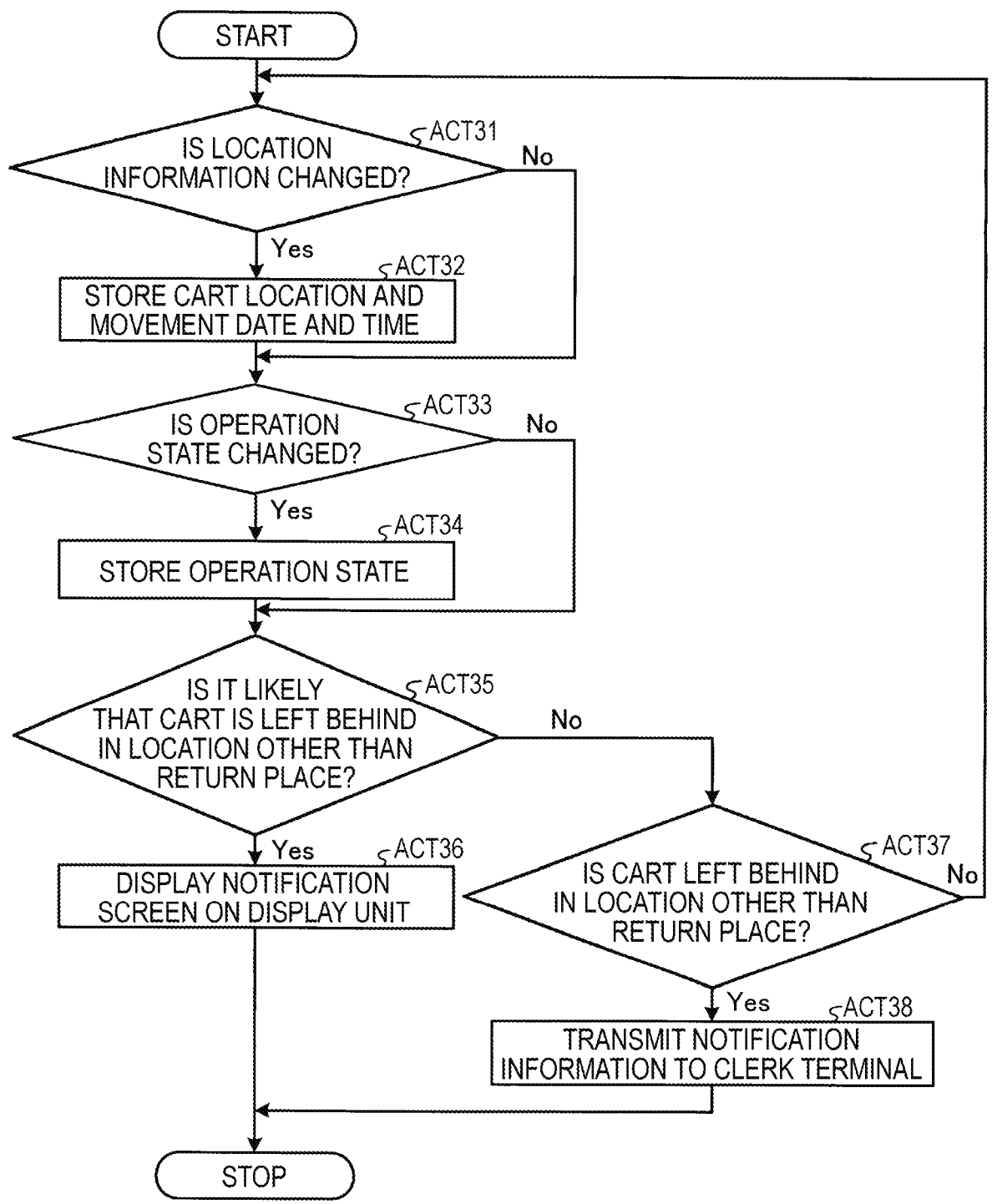
FIG. 13 is a flowchart illustrating an example of a process performed by the cart terminal according to the second embodiment.

Subsequently, the operation example of the cart terminal 66 described above is described. FIG. 13 is a flowchart illustrating an example of a process performed by the cart terminal 66.

First, the individual cart management unit 6601 compares the cart location (e.g., location information) stored in the individual cart management table T3 with the location information received by the short-range communication unit 167 from the short-range communication device 30 and determines whether the location information changes (ACT 31). When the location information changes, the individual cart management unit 6601 stores the location information after the change as the cart location in the individual cart management table T3 together with the movement date and time (ACT 32), and the process moves to ACT 33. In ACT 31, when the location information is not received, or the location information is not changed (ACT 31; No), the process moves to ACT 33.

Subsequently, the individual cart management unit 6601 compares the operation state stored in the individual cart management table T3 and the operation state of the merchandise registration unit 1601 and determines whether the operation state changes (ACT 33). When the operation state changes (ACT 33; Yes), the individual cart management unit 6601 stores the operation state after the change to the individual cart management table T3 (ACT 34), and the process moves to ACT 35. In ACT 33, when the operation state does not change (ACT 33; No), the process moves to ACT 35.

Subsequently, the notification control unit 6602 determines whether the cart 10 is likely to be left behind at another place apart from the return place P1 based on the information stored in the individual cart management table T3 (ACT 35). Here, when the notification control unit 6602 determines that the cart is likely to be left behind at a place apart from the return place P1 (ACT 35; Yes), the notification unit 1604 is controlled to display the notification screen on the display unit 162 (ACT 36), and the present process ends.

When the notification control unit 6602 determines that the cart 10 is left behind at another place apart from the return place P1 (ACT 35; No to ACT 37; Yes), the notification unit 1604 is controlled so that the notification information is transmitted to the clerk terminal (ACT 38), and the present process ends.

Even if the cart 10 is likely to be left behind at another place apart from the return place P1, when the notification control unit 6602 determines that the cart 10 is not left behind (ACT 35; No to ACT 37; No), the process returns to ACT 31.

As described above, when the cart terminal 66 is moved by the customer, the presence location of the cart 10 that the customer uses for transporting the purchased merchandise is detected, the presence location of the cart 10 is present at another place apart from the return place P1 for returning the shopping cart, and the stay time at the other place exceeds the threshold, a notification for promoting the return to the return place is made.

Accordingly, when the cart 10 is likely to be left behind at another place apart from the return place P1 or the cart 10 is left behind at another place apart from the return place P1, the cart terminal 66 can notify the customer or the clerk using the cart 10. Therefore, the cart terminal 66 can promote the return (e.g., movement) of the cart 10 to the return place. Accordingly, the cart terminal 66 can reduce the situation in which the cart 10 is not charged, and thus the increase of the operation rate of the cart 10 or the cart terminal 66 can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information processing device comprising:
a processing circuit having programmed instructions to:
determine a cart location of a shopping cart that is moved by a customer and used for transportation of a merchandise purchased by the customer;
provide a first notification promoting a return of the shopping cart to a return area for returning the shopping cart in response to a determination that (i) the shopping cart is located in a place outside of the return area and (ii) a stay time of the shopping cart at the place outside the return area exceeds a threshold length of time;

determine whether settlement of the merchandise is completed based on an operation state of a device coupled to the shopping cart that performs a process to facilitate purchasing the merchandise; and provide a second notification in response to a determination that (i) the shopping cart is located in the place outside of the return area, (ii) the stay time of the shopping cart at the place outside the return area exceeds the threshold length of time, and (iii) the settlement of the merchandise is completed.

2. The information processing device of claim 1, wherein the processing circuit has programmed instructions to provide a second notification in response to a determination that settlement of the merchandise has been completed.

3. The information processing device of claim 1, wherein the processing circuit has programmed instructions to determine the cart location of the shopping cart inside a store based on a communication record between (i) first short-range wireless devices provided at a plurality of locations inside the store including the return area and (ii) a second short-range wireless device coupled to the shopping cart.

4. The information processing device of claim 1, wherein the processing circuit has programmed instructions to recognize when the shopping cart is moved outside a store based on image data of an imaging device that images the outside of the store.

5. The information processing device of claim 4, wherein the processing circuit has programmed instructions to provide a second notification in response to a determination that the shopping cart is present outside of the store based on the image data of the imaging device.

6. A method of promoting a return of a shopping cart to a return area, the method comprising:

determining, by an information processing device, a cart location of the shopping cart that is moved by a customer and used for transportation of a merchandise purchased by the customer; and prompting, by the information processing device, a user to return the shopping cart to the return area in response to a determination that (i) the shopping cart is located in a place outside of the return area and (ii) the shopping cart has been stationary at the place outside the return area for greater than a threshold length of time.

7. The method of claim 6, wherein prompting, by the information processing device, the user to return the shopping cart to the return area includes providing a notification to the user through a cart terminal coupled to the shopping cart.

8. The method of claim 6, wherein prompting, by the information processing device, the user to return the shopping cart to the return area includes providing an auditory notification that is broadcast outside of a store, and wherein the return area is located within the store.

9. The method of claim 6, wherein prompting, by the information processing device, the user to return the shopping cart to the return area includes providing a notification to the user through a clerk terminal.

10. The method of claim 6, further comprising prompting, by the information processing device, the user to return the shopping cart to the return area in response to a determination that settlement of the merchandise has been completed.

11. A shopping cart system, comprising:

a shopping cart used for transportation of a merchandise by a customer;

a cart terminal coupled to the shopping cart;

a power supply positioned to provide electrical power to the shopping cart when the shopping cart is positioned within a return area located within a store; and an information processing device including a processing circuit having programmed instructions to:

provide a first notification prompting a user to return the shopping cart to the return area in response to a determination that the shopping cart is located inside of the store and at least one of (i) settlement of the merchandise is completed or (ii) the shopping cart has remained in a place outside of the return area for greater than a threshold length of time; and provide a second notification prompting the user to return the shopping cart to the return area in response to a determination that the shopping cart is located outside of the store, the second notification being different from the first notification.

12. The shopping cart system of claim 11, further comprising a plurality of short-range wireless devices provided inside the store, wherein the processing circuit has programmed instructions to determine a cart location of the shopping cart inside the store based on a communication record between the short-range wireless devices and the cart terminal.

13. The shopping cart system of claim 12, further comprising an imaging device that images the outside of the store, wherein the processing circuit has programmed instructions to:

recognize when the shopping cart is moved outside the store based on image data of the imaging device; and prompt the user to return the shopping cart to the return area in response to the determination that the shopping cart is located outside of the store.

14. The shopping cart system of claim 11, further comprising a clerk terminal, wherein the information processing device is configured to prompt the user to return the shopping cart to the return area by instructing the clerk terminal to provide at least one of the first notification or the second notification.

15. The shopping cart system of claim 11, wherein the information processing device is configured to prompt the user to return the shopping cart to the return area by instructing the cart terminal to provide at least one of the first notification or the second notification.

16. The information processing device of claim 1, wherein the first notification differs from the second notification.

17. The information processing device of claim 1, wherein the stay time of the shopping cart at the place outside the return area is a period of time during which the shopping cart is stationary.

18. The shopping cart system of claim 11, wherein the processing circuit has programmed instructions to provide the first notification prompting the user to return the shopping cart to the return area in response to a determination that the shopping cart is located inside of the store and at least one of (i) settlement of the merchandise is completed or (ii) the shopping cart has remained stationary in the place outside of the return area for greater than a threshold length of time.

* * * * *